INVENTORS.
RULON G. SHELLEY
BY JOHN L. BOWER

ATTORNEY

INVENTORS.
RULON G. SHELLEY
JOHN L. BOWER
BY
William R. Lane
ATTORNEY

FIG. 4

INVENTORS.
RULON G. SHELLEY
JOHN L. BOWER
BY William R. Lane
ATTORNEY

United States Patent Office 3,123,822
Patented Mar. 3, 1964

3,123,822
FILTER FOR INFORMATION EXPRESSED IN
ROTATING COORDINATES
Rulon G. Shelley and John L. Bower, Downey, Calif.,
assignors to North American Aviation, Inc.
Filed Mar. 19, 1954, Ser. No. 417,477
13 Claims. (Cl. 343—7.4)

This invention relates to information-smoothing, and more particularly to the smoothing of signals representing vector quantities expressed in a rotating coordinate system. It is related to copending application Serial No. 233,388 filed June 25, 1951 in the name of Rulon G. Shelley, for "Vector Filter System," now U.S. Patent No. 2,805,022.

This invention points out embodiments of the basic concept as set forth in copending application Serial No. 233,388 in order that it may be used in a radar tracking loop and, in other embodiments, in a radar tracking loop and, in other embodiments, in a radar tracking loop simultaneously with use in the fire control computing system.

In tracking, radar can easily be made to operate fast enough to pick up changing error signals as to target location, but if sufficient filtering is used to insure smooth tracking during perturbations of the interceptor, the radar tracking loop information lags the target too much. Space stabilization is a correction of this difficulty.

Space stabilization methods presently used in radar tracking circuits are schemes to compensate for airframe angular velocity. This application proposes space stabilizing radar in a new manner and according to absolute antenna angular velocity. Present stabilization methods only partly correct the radar signals for pitch and yaw and not at all for roll of the airframe. Application of the vector filtering system to the radar tracking circuits provides tracking with less lag and provides the space stabilization loops.

The problem of smoothing information occurs frequently in fire control, tracking, and computing systems. The fire control problem is one of collecting and correlating known information about a target (i.e., present range, how much it is changing, and the direction of change) and predicting therefrom other information, such as future position, range-to-hit, and target velocity. Such information is also useful in the tracking circuit so that the radar antenna can be directed to follow the target during maneuvers by interceptor or target. Such collected information invariably contains noise, and to obtain the best possible tracking and prediction on the basis of such information, some sort of filtering or smoothing is required to remove the noise and derive a smoothly changing signal as distinguished from an erratically varying one. The erratic variations, which are due to noise, must necessarily be removed.

Radar information, while being collected or computed, is expressed in regard to a chosen coordinate system. This reference system is established by the radar antenna. It is, therefore, an essential requirement that consideration be given to the antenna.

The information concerning a target is, generally, a vector quantity which varies both in direction and magnitude. Such a vector is easily expressed in a righ-handed Cartesian coordinate system in terms of its three components, each along an axis of the coordinate system of the radar antenna. A first or second order derivative or integral of the vector may be desirable in tracking, predicting target position and speed, or in constructing a filter section. If the coordinate system is nonrotating in space, an electrical signal representing a vector component can be differentiated or integrated by differentiating or integrating its magnitude. Similarly, any desired filtering can be performed on a resultant vector by filtering the scalar magnitude of each of the electrical signals representing the component vectors. However, information is generally furnished not in a nonrotating system but in a rotating system, such as the coordinates of an airframe, radar antenna, or the like. The coordinate system, itself, has an angular velocity (rotation) and it is no longer exact to differentiate the scalar magnitudes of each component of the vector to find the rate of change. This is true because each component varies not only due to absolute variations of the vector, but also appears to vary because of the rotation of the coordinate system (i.e., radar antenna) in which the component is expressed. The cross roll error in fire control is an example of an error generated by not having due regard to the angular velocity of the reference coordinate system when making predictions as to target position.

A conventional method of filtering vector quantities when the components are expressed in a rotating coordinate system is to continuously transform the components to a nonrotating coordinate system and operate on the new three inertially-expressed components by conventional feedback filters. The smoothed vector is then transformed back to the rotating coordinate system. Such a method requires a physical, nonrotating reference, stabilized in space, gimbal angle pickoffs to denote relative angles between the rotating coordinate system and a nonrotating coordinate system (e.g. between the radar antenna and a stable platform) and complicated resolving equipment to perform the transformation to nonrotating coordinates and back to rotating coordinates.

Other methods of computing and tracking have simply overlooked such errors or have used apparatus which has a slow response and, therefore, lags considerably in the solution of these problems of tracking or computing.

If, when information is expressed in rotating coordinates, differentiation or integration of the electrical signal representing a vector is carried out and corrected by the error due to the rotation or angular velocity of the coordinate system, a theoretically exact solution of the fire control, filter or tracking problem occurs wherever derivative or integral terms of the components ae needed. In the copending application on the "Vector Filter System," it is indicated that the information as to angular velocities of the radar in roll, pitch, and yaw were to be obtained from rate gyros mounted upon the radar antenna.

It is therefore an object of this invention to provide apparatus for smoothing signals representing a vector quantity expressed in a coordinate system which is rotating.

It is another object of this invention to provide a filter for signals expressing a vector taking into account rotation of the coordinate system.

A further object of this invention is to provide information smoothing apparatus having a minimum response time.

Another object of this invention is to provide a radar tracking filter having a minimum response time.

A still further object of this invention is to provide a smoothing circuit which is used simultaneously in fire control computing and radar tracking.

Other objects of invention will become apparent from the following description taken in connection with the accompanying drawings, in which.

Figures 1, 5:
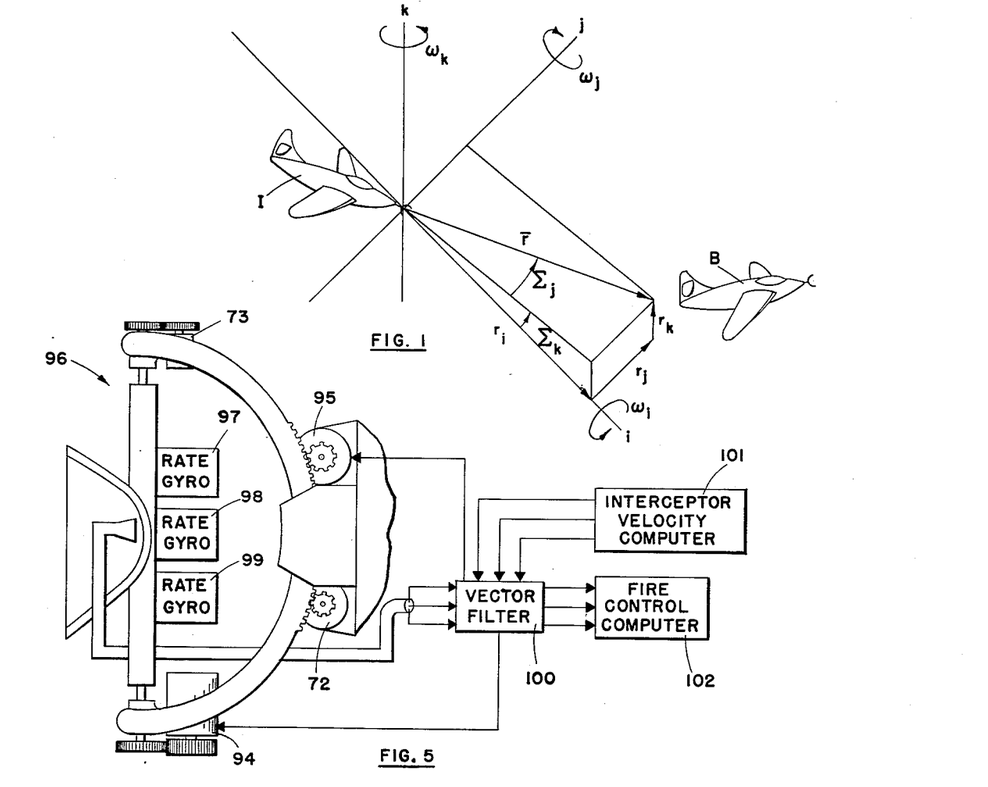
FIG. 1 is a perspective view of an interceptor and a bomber, together with the rotating coordinate system of the antenna, denoted by axes $i$, $j$, and $k$, and indicating the target range vector, $\bar{r}$.
FIG. 5 is a block diagram showing the antenna, filter and computers.

In FIG. 1, an interceptor I carries radar apparatus in its nose, which radar presents range information along coordinate axes denoted $i$, $j$, and $k$, where the $i$ axis is the direction the radar antenna is pointing, which is quite close to the line of sight from the interceptor I to a target bomber B when radar tracking occurs. Axes $i$, $j$, and $k$ are mutually orthogonal.

The radar furnishes three signals of the information shown in FIG. 1, range $r$ (substantially $r_1$), $\Sigma_j$ antenna yaw error angle, and $\Sigma_k$ antenna pitch error angle. From inspection of the figure, it can be seen that multiplication of $\Sigma_j$ and $\Sigma_k$ by range, $r$, gives $r_j$ and $r_k$ antenna yaw range error and pitch range error, respectively. These are hereinafter referred to as "yaw error" and "pitch error," respectively. This provides the components of resultant target vector $\bar{r}$ then, which require filtering according to vector mathematics.

Figure 2:
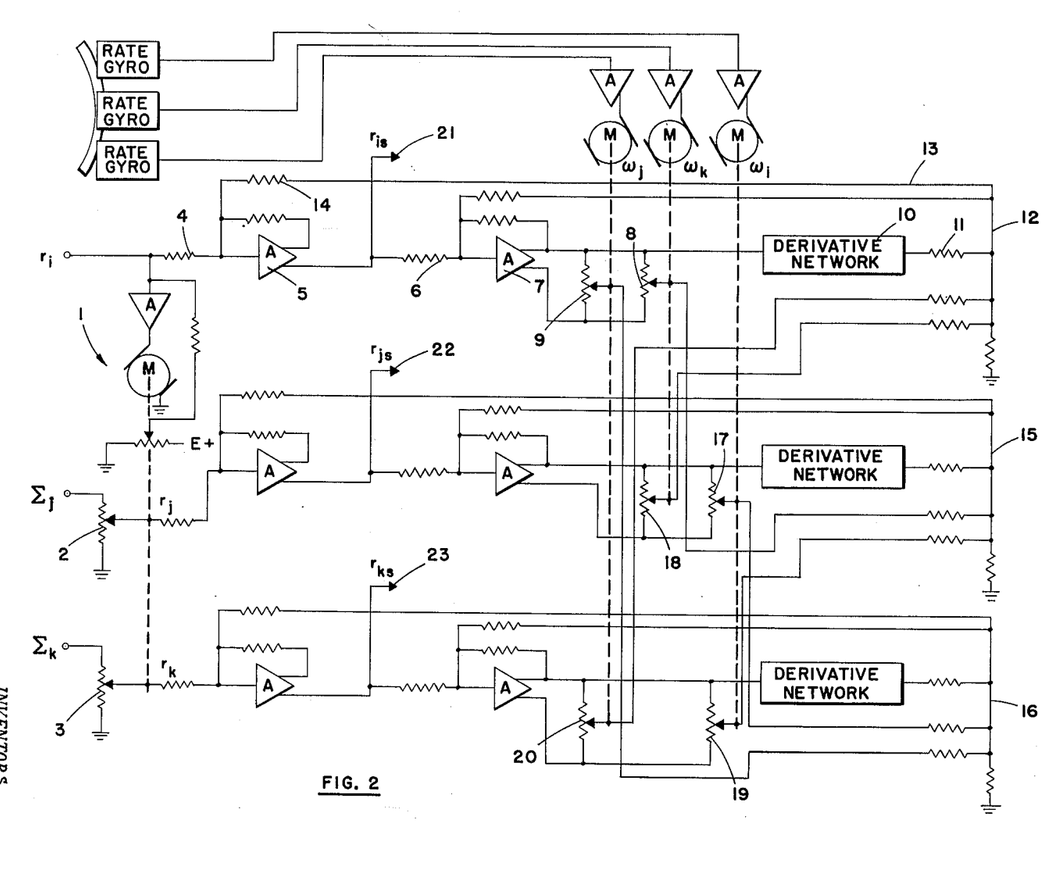
FIG. 2 is a first order filter according to vector analysis theory.

A first order filter is one that makes use of a first derivative or integral of the signal. A second order filter is one that also makes use of second derivatives or second integrals to filter a signal. In FIG. 2 is shown a first order derivative filter. The three signals received from the radar are $r_1$, $\Sigma_j$, yaw angular error, and $\Sigma_k$, pitch angular error. Servo motor 1, driven according to the $r_1$ signal, drives the wiper of potentiometer 2. The winding of potentiometer 2 is excited by $\Sigma_j$ and, therefore, the wiper output of potentiometer 2 is $r_j$. Similarly, the output of the wiper of potentiometer 3 produces $r_k$. The three components $r_1$, $r_j$, and $r_k$ define the resultant $\bar{r}$ of FIG. 1.

Signal $r_1$ passes resistor 4 and then phase inverting amplifier 5 and then resistor 6 to a second phase inverting amplifier 7 whose output is across the windings of potentiometers 8 and 9. The output of amplifier 7 also passes through derivative network 10, through resistor 11 to summing point 12 and by negative feedback loop 13 and resistor 14 to the input of amplifier 5. A similar circuit is ilustrated for each of the signals along the other two axes $r_j$ and $r_k$. The wiper of potentiometer 8 is driven according to the angular velocity of the radar antenna in yaw, $\omega_k$, and the wiper of potentiometer 9 is driven according to the angular velocity of the radar antenna in pitch, $\omega_j$. The wiper output of potentiometer 8 is then a cross product signal $\omega_k r_1$ fed to summing point 15 which removes the errors in the derivative of the $r_j$ signal which arise from the angular velocity of the antenna in yaw. Also, the wiper output of potentiometer 9 is a cross product signal $\omega_j r_1$ fed to summing point 16 which corrects the errors in the $r_k$ signal due to the pitch of the antenna. The wipers of potentiometers 8, 9, 17, 18, 19, and 20 are driven according to roll, pitch and yaw gyros mounted on the antenna and provide the necessary cross product terms to correct each component $r_1$, $r_j$, and $r_k$ for antenna roll, pitch, and yaw. Inasmuch as the antenna is mounted on the airframe, the airframe roll, pitch, and yaw is automatically included. In another concept, all angular motion of the antenna i.e., the absolute angular velocity, is measured, and each received signal is corrected to appear as if the antenna were stabilized in space. The smoothed signal output along each axis is received at points 21, 22 and 23. Derivative network 10 and feedback loop 13 provides conventional derivative negative feedback filtering of the $r_1$ component. The $r_j$ and $r_k$ components are similarly filtered by their respective derivative networks and negative feedback loops. From an inspection of FIG. 2, symmetry can be seen in that at each of the summing points 12, 15 and 16 is added a cross product term from two potentiometers. For example, at summing point 16, which receives a filtered derivative of the $r_k$ signal, is added the signals from potentiometers 9 and 17. The signal from potentiometer 9 is a cross product term $\omega_j$ and $r_1$ and the signal from potentiometer 17, $\omega_1$ and $r_j$. These terms are typical cross product terms by which the derivative of each signal $r_i$, $r_j$ and $r_k$ must be corrected because they are expressed in the rotating coordinate system of the antenna.

Figure 3:
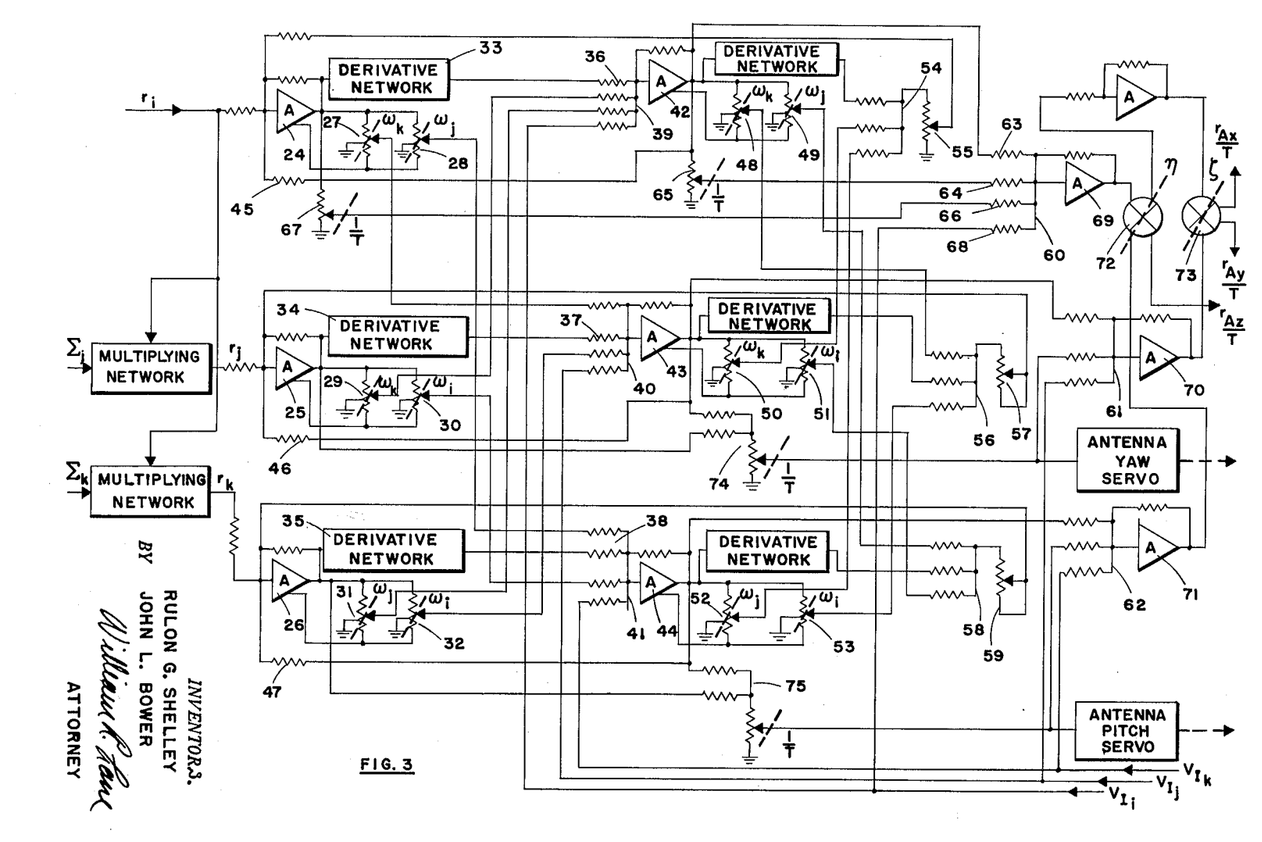
FIG. 3 is an A.-C. or D.-C. embodiment of a second order filter providing fire control information and information to drive the radar antenna to remove yaw error and pitch error in accordance with this invention.

FIG. 3 is a second order filter using the same basic concept of FIG. 2 in transformation of antenna pitch and yaw angular errors into $r_k$ and $r_j$, respectively. Each of the three components $r_1$, $r_j$ and $r_k$ are then received by respective amplifiers 24, 25 and 26, respectively. These amplifiers develop phase inverted voltages across the windings of potentiometers 27 and 28, 29 and 30, and 31 and 32, respectively. Derivative networks 33, 34 and 35 also receive the output signals of amplifiers 24, 25 and 26 and after taking the derivatives pass them to resistors 36, 37 and 38, to summing points 39, 40 and 41 at the inputs to amplifiers 42, 43 and 44. Also, received at point 39 are the wiper outputs of potentiometers 29 and 31 and the velocity $V_{Ii}$, which is the velocity of the interceptor along the $i$ axis. Thus, the signal at summing point 39 is a first derivative of the radar range signal (along the $i$ axis) with the effects of pitch and yaw removed and the effects of the interceptor's own velocity in the $i$ direction removed. The same is true for summing point 40 at which the signal is the first derivative of the $r_j$ component of FIG. 1 with the effects of pitch and roll and effects of interceptor's own velocity in the $j$ direction, $V_{Ij}$, removed. At summing point 41 the signal is the first derivative of the $r_k$ component of FIG. 1 with the effects of roll and yaw and effects of the interceptor's own velocity in the $k$ direction, $V_{Ik}$, removed. In effect, three component vectors $V_{Bis}$, $V_{Bjs}$, and $V_{Bks}$ of the absolute velocity of the target are thus computed according to the following equations:

(1) $\quad V_{Bis} = \dot{r}_{is} + V_{Ii} - (\omega_k r_{js} - \omega_j r_{ks})$ (2) $\quad V_{Bjs} = \dot{r}_{js} + V_{Ij} - (\omega_i r_{ks} - \omega_k r_{is})$ (3) $\quad V_{Bks} = \dot{r}_{ks} + V_{Ik} - (\omega_j r_{is} - \omega_i r_{js})$ where:

$V_{Bis}$, $V_{Bjs}$, $V_{Bks}$ = smoothed bomber velocity along respective axes $i$, $j$ and $k$.

$\dot{r}_{is}$, $\dot{r}_{js}$ and $\dot{r}_{ks}$ = derivatives of smoothed range signals derived from the radar signals.

$\omega_i$, $\omega_j$, $\omega_k$ = angular velocity of coordinate system about the axes $i$, $j$ and $k$.

$r_{is}$, $r_{js}$, $r_{ks}$ = smoothed range signals obtained from the unsmoothed radar signals.

Each of the smoothed range signals $r_{is}$, $r_{js}$, and $r_{ks}$ is obtained from the unsmoothed range signals $r_1$, $r_j$, and $r_s$ as follows:

(4) $\quad r_{is} = r_1 - K_1 V_{Bis} - K_2 A_{Bis}$ (5) $\quad r_{js} = r_j - K_1 V_{Bjs} - K_2 A_{Bjs}$ (6) $\quad r_{ks} = r_k - K_1 V_{Bks} - K_2 A_{Bks}$ where:

$K_1$ and $K_2$ = constants which determine the amount of feedback, giving the filter a particular time response characteristic, and the acceleration terms are defined as follows:

(7) $\quad A_{Bis} = \dot{V}_{Bis} + \omega_j V_{Bks} - \omega_k V_{Bjs}$ (8) $\quad A_{Bjs} = \dot{V}_{Bjs} + \omega_k V_{Bis} - \omega_i V_{Bks}$ (9) $\quad A_{Bks} = \dot{V}_{Bks} + \omega_i V_{Bjs} - \omega_j V_{Bis}$ Amplifiers 42, 43 and 44 receive first order derivative signals $V_{Bi}$, $V_{Bj}$ and $V_{Bk}$ and to obtain conventional smoothing feeds back a portion of each derivative to the input of amplifiers 24, 25 and 26 through resistors 45, 46 and 47. Amplifiers 42, 43 and 44 excite the windings of potentiometers 48 and 49, 50 and 51, and 52 and 53, respectively, with phase inverted outputs. The wipers of these potentiometers are positioned according to absolute angular velocity of the antenna in pitch, roll and yaw, in the same manner as the potentiometers 27, 28, 29, 30, 31 and 32.

At summing point 54, then, is received a second derivative of the input range signal along the $i$ axis, a cross product term $\omega_k V_{Bj}$ from the wiper of potentiometer 50, and a cross product term $\omega_j V_{Bk}$ from potentiometer 52. Through potentiometer 55 a portion of this second derivative is fed back to the input of amplifier 24. Second order derivative vector filtering along the $i$ axis has been traced thus far.

At summing point 56 are received, a second derivative of the input range signal along the $j$ axis, a cross product term $\omega_k V_{Bi}$ from the wiper of potentiometer 48 and a cross product term $\omega_i V_{Bk}$ from potentiometer 53. Through potentiometer 57 a portion of this second derivative is fed back to the input of amplifier 25 providing second order derivative vector filtering along the $j$ axis.

At summing point 58 are received, a second derivative of the input range signal along the $k$ axis, a cross product term $\omega_i V_{Bj}$ from the wiper of potentiometer 51 and a cross product term $\omega_j V_{Bi}$ from the wiper of potentiometer 49. Through potentiometer 59 a portion of this second derivative is fed back to the input of amplifier 26 providing second order derivative vector filtering along the $k$ axis.

As the feedback loops and the cross product multipliers operate upon the received information, the outputs of amplifiers 24, 25 and 26 become smoothed range components. The outputs of amplifiers 42, 43 and 44 become smoothed velocity components.

At summing point 60, through resistor 63 is received the smoothed velocity signal $V_{Bis}$, and through resistor 64 is received the smoothed velocity signal $V_{Bis}$ divided by a factor of time-to-go-until-hit introduced by potentiometer 65. A servo drive according to externally computed time-to-go-until-hit positions the wiper of potentiometer 62. It facilitates computer mechanization if the output information of this filter includes a numerator of time-to-go-until-hit. A third, smoothed range signal is received through resistor 66 from potentiometer 67, also positioned by the time-to-go-until-hit servo. Through resistor 68 is removed interceptor velocity along the axis $V_{Ii}$ which was previously introduced in order to obtain smoothing. The equations of the signals received at summing points 60, 61 and 62 are, therefore:

(10) $$\frac{r_{Ai}}{T} = \frac{r_{is}}{T} + \frac{K_1 V_{Bis}}{T} + V_{Bis} - V_{Ii}$$

(11) $$\frac{r_{Aj}}{T} = \frac{r_{js}}{T} + \frac{K_1 V_{Bjs}}{T} + V_{Bjs} - V_{Ij}$$

(12) $$\frac{r_{Ak}}{T} = \frac{r_{ks}}{T} + \frac{K_1 V_{Bks}}{T} + V_{Bks} - V_{Ik}$$

where:

$$\frac{r_{Ai}}{T}, \frac{r_{Aj}}{T}, \text{ and } \frac{r_{Ak}}{T}$$

are second order smoothed advance range components divided by time-to-go-until-hit; which equations show predictions of the smoothed signals along each axis. They are filtered and smoothed taking into account the angular velocity of the radar antenna.

The outputs of summing points 60, 61 and 62 are received by amplifiers 69, 70 and 71. The outputs of these amplifiers are $$\frac{r_{Ai}}{T}, \frac{r_{Aj}}{T}, \text{ and } \frac{r_{Ak}}{T}$$

the smoothed advance range components to the bomber divided by the time-to-go-until-hit with the effects of the interceptor on change of range removed.

If it is desired that these range signals be utilized in airframe coordinates (for indicator display or fire control), the signals are transformed by elevation resolver 72 and azimuth resolver 73. Elevation resolver 72, FIGS. 5 and 2, is rotated according to the elevation of the antenna relative to the airframe, $\eta$, and azimuth resolver 73 is driven according to the azimuth of the antenna, $\zeta$, relative to the airframe. The outputs of these resolvers are three space stabilized range signals $$\frac{r_{Ax}}{T}, \frac{r_{Ay}}{T}, \text{ and } \frac{r_{Az}}{T}$$

expressed in airframe coordinates $x$, $y$, and $z$.

An inspection of the circuit discloses that a smoothed signal representing the antenna yaw error is obtainable at point 74, and antenna pitch error, at point 75. If these are smoothed signals indicating the antenna pointing error, they can be used along with servo drives to position the antenna until it has no error, as indicated.

Figure 4:
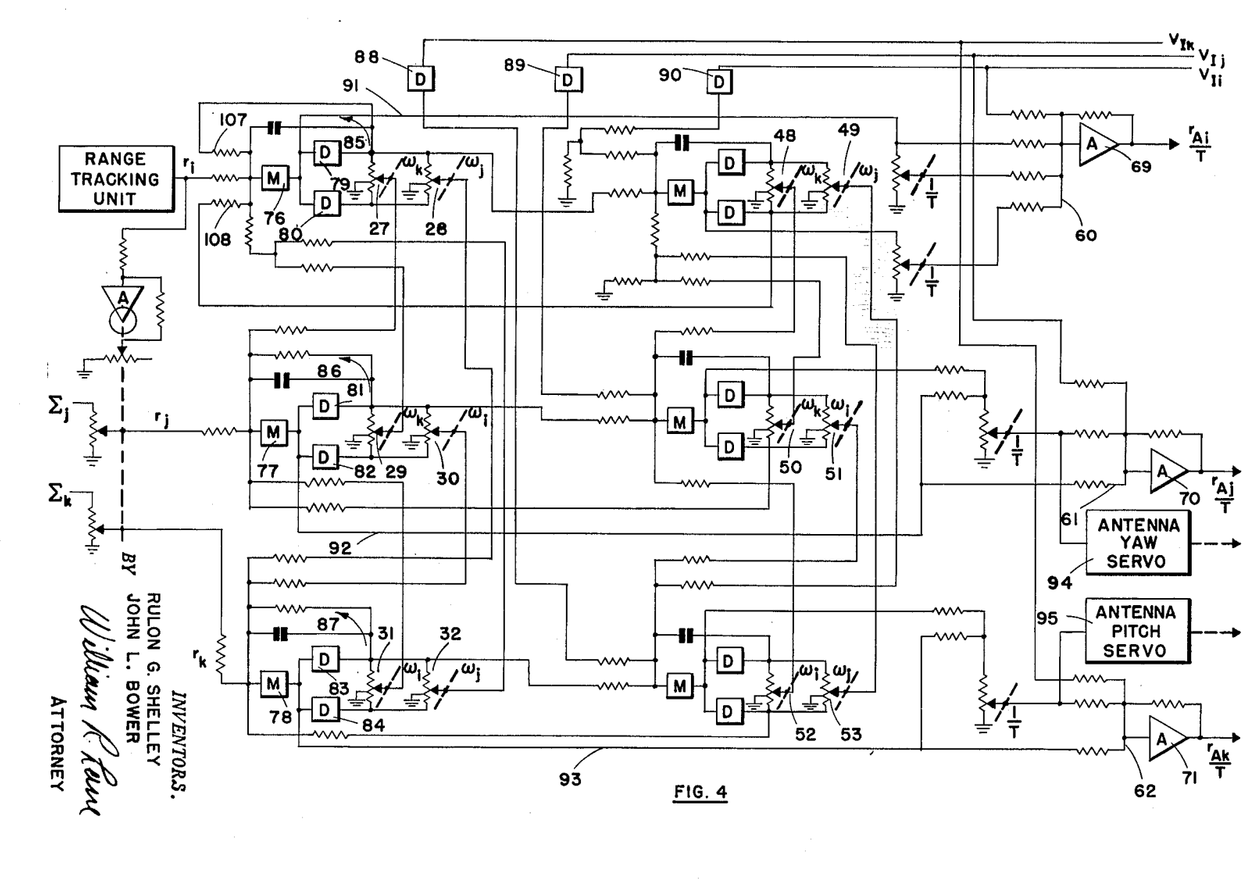
FIG. 4 is another A.-C. embodiment of the device of the invention.

In FIG. 4 is shown an A.-C. system in which modulation and demodulation are used. An A.-C. system is desirable because it is then easy to transform the smoothed signals into airframe coordinates using A.-C. resolvers. The three radar signals are received and transformed into $r_i$, $r_j$, $r_k$ similarly to the embodiment of FIG. 3. The amplifiers of FIG. 3 are replaced, however, by high gain modulators 76, 77, and 78 and dual demodulator units 79 and 80, 81 and 82, and 83 and 84. These modulator and demodulator units are provided with derivative feedback circuits 85, 86 and 87 to achieve conventional filtering. The dual demodulators are phase sensitive having both plus and minus D.-C. outputs and are used to excite the windings of the cross product potentiometers 27, 28, 29, 30, 31, and 32.

The similarity of the circuits of FIG. 3 and FIG. 4 is readily discernible in that cross product terms are obtained along each axis from the potentiometers and fed to correct the information along another axis. Also, the interceptor velocity is introduced as in FIG. 3 with the difference that demodulators 88, 89, and 90 transform the A.-C. signals to D.-C. Another difference is the output, which is provided by lines 91, 92, and 93 in FIG. 4 immediately follows the first modulators 76, 77, and 78 in order that A.-C. signals be obtained for output.

Antenna yaw servo 94 receives output signals and drives the antenna in yaw until there is no signal. Antenna pitch servo 95 receives output signals and drives the antenna in pitch until there is no signal. In this way, the antenna is pointed at the target with a minimum of lag.

In FIG. 5, a block diagram is indicated the interrelationship of the antenna, filter, and computers. The antenna 96 has three rate gyros 97, 98, and 99 mounted to detect the absolute angular velocity of the antenna about its three axes. The vector filter system 100, as herein described, receives interceptor velocity information from velocity computer 101 and provides smoothed fire control information to fire control computer 102 and smooth antenna positioning information to the antenna yaw and pitch servos 94 and 95.

In automatic range tracking by radar, a time modulator in the receiver provides a pulse at modulated time intervals for a reference pulse. A time discriminator compares the time modulated output with the time modulation of the echo and provides an output to control the time modulator. In this way, the time modulator is "servoed" to follow the time modulation of the echo pulses.

Figure 6:
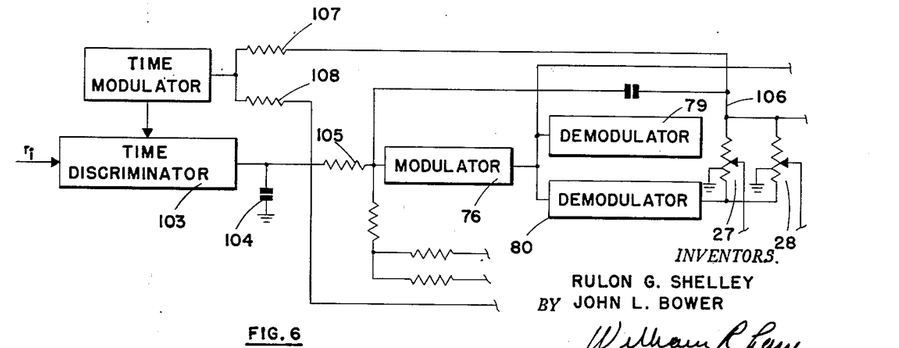
FIG. 6 indicates how the computer of FIG. 4 may be used to replace the double integrating portion of a radar range tracking unit.

In order to suitably control the time modulator, the output of the time discriminator must be smoothed and integrated so that noise does not cause variations in the output of the time modulator. Previously, single and double integrator circuits were used to perform the smoothing and integrating. The device of FIG. 6 shows how such integrators may be replaced by the vector filter system. The current pulse output of the time discriminator 103 is summed by a capacitor 104, then fed through resistor 105 to the modulator 76 of the $r_i$ channel. The output, then, taken at point 106 is filtered and passes through resistor 107 to be combined with the second order smoothed range information, $r_{is}$, through resistor 108. The output is a filtered and smoothed signal which can be used to drive the time modulator. Such a system assumes that the $r_i$ is substantially the same value as $\bar{r}$ (see FIG. 1). Using the vector filter system shown in FIGS. 3 or 4 to remove antenna yaw and pitch error allows this assumption to be made.

Positioning the radar antenna as taught herein offers the advantage that even after loss of signals the radar would continue tracking regardless of interceptor maneuvers. Further, tracking and computer units are herein merged into a single system.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A radar antenna positioning system comprising means for generating signals according to the absolute angular velocity of the antenna of said radar about one or more of its axes, means for filtering the signals of said radar in accordance with said signals as to angular velocity, and means for positioning the antenna of said radar according to the output of said filtering means.

2. A radar antenna positioning system comprising means for generating signals according to the absolute angular velocity of the antenna of said radar about one or more of its axes, means for filtering the signals as to target position received from said radar, means for correcting the filtered signals as to target position in accordance with the signals as to angular velocity, and means for positioning the antenna of said radar according to said corrected, filtered signals.

3. In a tracking and fire control computing system wherein a radar provides signals representing components of the range vector to the target, the combination of one or more filters each receiving a component signal from said radar, means for generating signals indicating the absolute angular velocity of the antenna of said radar about one or more of its axes, means associated with said filters for multiplying each generated signal representing absolute angular velocity about an axis by each said signal component along another axis, means for combining their product with the signal component along the remaining axis, and means for positioning the antenna of said radar in accordance with the output of one or more of said filters.

4. The combination recited in claim 3 wherein is included means for connecting the filtered range output of said filter means to drive the time modulator of said radar.

5. In a radar tracking system wherein a radar provides signals as to target range, antenna yaw error, and antenna pitch error, a filter for antenna pitch error and yaw error comprising means for producing signals according to the absolute angular velocity in pitch, roll, and yaw of the antenna of said radar, means for multiplying said signal of angular velocity in pitch by said signal as to target range, means for multiplying said signal of absolute angular velocity in roll by said signal of antenna yaw error, first means for combining said two product signals with said signal as to antenna pitch error, means for multiplying said signal of absolute angular velocity in yaw by said signal as to target range, means for multiplying said signal of absolute angular velocity in roll by said signal as to antenna pitch error, second means for combining the product of said two immediately preceding signals with said signal of antenna yaw error, and means for positioning said antenna in accordance with said combined signals.

6. The combination recited in claim 1 wherein said means for producing signals according to the absolute angular velocity in pitch, roll, and yaw of the antenna comprises three rate gyros mounted on said antenna.

7. In a fire control system wherein radar provides signals as to the target with respect to a three axis coordinate system, the signals being range, antenna yaw error and antenna pitch error, a tracking and computing system comprising three filters each receiving one of said signals, means for generating signals according to the absolute angular velocity of the radar antenna about one or more of its axes, means associated with said filters for multiplying each generated signal according to absolute angular velocity about an axis by each said signal componint along another axis, means for combining their product with the signal component along the remaining axis, and means for positioning said antenna according to the smoothed output of said filters.

8. In a tracking and computing system wherein a radar provides signals as to target range, antenna yaw error, and antenna pitch error, the combination of three filters each receiving one of said radar signals, means for generating signals according to the absolute angular velocity of the radar antenna in pitch, roll, and yaw, means associated with said filters for multiplying said generated signals according to absolute angular velocity of the radar antenna in roll by said signal according to antenna yaw error, and means for multiplying said generated signal of said radar according to absolute angular velocity of said radar antenna in pitch by said signal according to target range, means for combining said multiplied signals with said antenna pitch error signal, whereby a filtered error signal is provided for directing the antenna of said radar in pitch, and means for multiplying said generated signal according to absolute angular velocity of said radar antenna in yaw by said signal according to target range, means for multiplying said signal according to the absolute angular velocity of said radar antenna in roll by said signal according to antenna pitch error, and means for combining said multiplied signals with said antenna yaw error signal, whereby a filtered error signal is provided for training the antenna of said radar in yaw.

9. The combination recited in claim 8 wherein said means for generating signals according to the absolute angular velocity of said radar antenna in pitch, roll, and yaw comprises three rate gyroscopes mounted on the antenna of said radar.

10. In a tracking and fire control system wherein a radar provides information along three axes which are signals as to target range, antenna yaw error, and antenna pitch error, three filters each receiving one of said radar signals, means for generating signals according to the absolute angular velocity of the antenna of said radar about the antenna pitch, roll, and yaw axes, means associated with said filters for multiplying each said signal of absolute angular velocity about one axis by said radar signal along another axis, and means for combining each said product with the radar signal along the third axis, means responsive to the output of said filters to direct said antenna in pitch yaw.

11. In a tracking and fire control computing system in combination with a radar providing signals representing components of the target vector expressed in the rotating coordinate system of the radar antenna, one or more filters each receiving a component signal from said radar, means for generating signals indicating the absolute angular velocity of the antenna of said radar about one or more of its axes, means associated with said filters for multiplying each said signal representing absolute angular velocity about an axis by each of said vector components along another axis and means for combining the product with the signal component along the remaining axis, means for producing signals indicating the interceptor's velocity along one or more of the antenna axes, means for combining said signals according to interceptor velocity with said vector signal components for removing the effects of the interceptor's velocity from said vector component signals, means for positioning the antenna of said radar according to the smoothed output of said filters.

12. In a radar tracking and fire control computer system wherein a radar provides signals as to target range, antenna yaw error, and antenna pitch error, a first filter section comprising three filters each receiving one of said radar signals, means for generating signals according to the absolute angular velocity of the antenna of said radar about the antenna pitch, roll, and yaw axes, means associated with said filters for multiplying each said signal of absolute angular velocity about one axis by said radar signal along another axis and means for combining each said product with the radar signal along the third axis, a second filter section comprising three filters each receiving an output of a filter in said first filter section, means associated with said second section filters for multiplying each said signal of absolute angular velocity about one axis by said radar signal along another axis and means for combining each said product with the radar signal along the third axis, means for introducing into the second filter section at each filter of a radar signal along an axis a signal representing velocity of the system along that axis, and means responsive to the output of said filter sections to direct the antenna of said radar.

13. In a radar tracking and fire control computer system, wherein a radar provides signals as to target range, angular yaw error and angular pitch error, means for multiplying said target range signal by said angular yaw error signal to provide a yaw error signal and means for multiplying said target range signal by said angular pitch error signal to provide a pitch error signal, a first filter section comprising three filters adapted to receive said signal as to target range, said yaw error signal and said pitch error signal, respectively, means for generating signals according to the absolute angular velocity of the antenna of said radar about the antenna pitch, roll, and yaw axes, means for multiplying the output of each filter of a signal along an axis by said signal of absolute angular velocity about another axis and means for combining their product with the signal along the third axis, means for combining velocity of the tracking system along each axis with the output of respective filters of signal along that axis, a second filter section comprising three filters adapted to receive the signal output of the filters of said first filter section, means for multiplying the output of each filter of a signal along an axis by said signal of absolute angular velocity about another axis and means for combining their product with the signal along the third axis, and means responsive to the output of said filter sections to drive the antenna of said radar in yaw and pitch.

References Cited in the file of this patent
UNITED STATES PATENTS

| | | |
|---|---|---|
| 2,414,108 | Knowles | Jan. 14, 1947 |
| 2,426,658 | Wooldridge | Sept. 2, 1947 |
| 2,462,456 | Bedford | Feb. 22, 1949 |
| 2,557,401 | Agins | June 19, 1951 |

UNITED STATES PATENT OFFICE
CERTIFICATE OF CORRECTION

Patent No. 3,123,822                              March 3, 1964

Rulon G. Shelley et al.

It is hereby certified that error appears in the above numbered patent requiring correction and that the said Letters Patent should read as corrected below.

Column 1, line 20, strike out "and, in other embodiments, in a radar tracking loop"; line 64, for "righ-handed" read -- right-handed --; column 2, line 43, for "ae" read -- are --; column 5, line 55, equation (11), for that portion reading:

$$\frac{r_{Ai}}{T} \quad \text{read} \quad \frac{r_{Aj}}{T}$$

column 8, lines 16 and 17, for "componint" read -- component --; line 62, after "pitch" insert -- and --.

Signed and sealed this 29th day of December 1964.

(SEAL)
Attest:

ERNEST W. SWIDER                              EDWARD J. BRENNER
Attesting Officer                              Commissioner of Patents

UNITED STATES PATENT OFFICE
CERTIFICATE OF CORRECTION

Patent No. 3,123,822                                March 3, 1964

Rulon G. Shelley et al.

It is hereby certified that error appears in the above numbered patent requiring correction and that the said Letters Patent should read as corrected below.

Column 1, line 20, strike out "and, in other embodiments, in a radar tracking loop"; line 64, for "righ-handed" read -- right-handed --; column 2, line 43, for "ae" read -- are --; column 5, line 55, equation (11), for that portion reading:

$$\frac{r_{Ai}}{T} \quad \text{read} \quad \frac{r_{Aj}}{T}$$

column 8, lines 16 and 17, for "componint" read -- component --; line 62, after "pitch" insert -- and --.

Signed and sealed this 29th day of December 1964.

(SEAL)
Attest:

ERNEST W. SWIDER                              EDWARD J. BRENNER
Attesting Officer                                Commissioner of Patents